United States Patent [19]
Kawagoe et al.

[11] Patent Number: 5,961,595
[45] Date of Patent: Oct. 5, 1999

[54] NETWORK MANAGEMENT SYSTEM WITH A HARDWARE RESOURCE MANAGEMENT MODULE SHARED BETWEEN NETWORKS

[75] Inventors: Teruyuki Kawagoe; Katsuyuki Tanaka, both of Tokyo, Japan

[73] Assignee: NEC Corporation, Tokyo, Japan

[21] Appl. No.: 08/878,534

[22] Filed: Jun. 19, 1997

[30] Foreign Application Priority Data

Jun. 21, 1996 [JP] Japan ..................................... 8-181182

[51] Int. Cl.$^6$ ........................... G06F 13/00; G06F 13/38; H04L 29/06
[52] U.S. Cl. ........................... 709/223; 709/250; 709/303
[58] Field of Search ........................ 395/200.53, 200.76, 395/683; 709/223, 224, 246, 226, 227, 250, 303

[56] References Cited

U.S. PATENT DOCUMENTS

| | | | |
|---|---|---|---|
| 5,471,617 | 11/1995 | Farrand et al. | 395/700 |
| 5,729,688 | 3/1998 | Kim et al. | 395/200.56 |
| 5,742,762 | 4/1998 | Scholl et al. | 395/200.3 |
| 5,751,962 | 5/1998 | Fanshier et al. | 395/200.53 |
| 5,822,535 | 10/1998 | Takase et al. | 395/200.56 |
| 5,828,842 | 10/1998 | Sugauchi et al. | 395/200.53 |

FOREIGN PATENT DOCUMENTS 408147231   6/1996   Japan .

OTHER PUBLICATIONS

K. Minato, "Using GDMO Description for a Local Management Interface", *Communication Society Assembly, The Institute of Electronics, Information and Communication Engineers*, B–448, 1995, p. 115.

*Primary Examiner*—Mark H. Rinehart
*Attorney, Agent, or Firm*—Sughrue, Mion, Zinn, Macpeak & Seas, PLLC

[57] ABSTRACT

A network management system comprising a manager, a resource manager for managing resources of a managed device by an inherent protocol, and an interface, directly managed by the manager, for sending the resource manager an operation request issued from the manager by the standard protocol after it has been converted into the operation request by the inherent protocol and sending the manager a reply message from the resource manager after it has been converted into the message by the standard protocol, the resource manager characterized in that an instance of the managed device is managed by the same unit as the managed object in the managed information base connected to the interface.

9 Claims, 6 Drawing Sheets

NETWORK MANAGEMENT SYSTEM WITH A HARDWARE RESOURCE MANAGEMENT MODULE SHARED BETWEEN NETWORKS

BACKGROUND OF THE INVENTION

1. Field of the Invention

The present invention relates to a network management system, and more particularly to a network management system for managing hardware with a hardware resource management module shared between networks.

2. Description of the Related Art

As a communication protocol in a network, a standard protocol such as OSI(Open Systems Interconnection) protocol and SNMP(Simple Network Management Protocol) is predetermined so as to enable the data exchange between different types of computers. A network management system for managing the hardware resources in a network adopts such a standard protocol so as to manage the hardware.

FIG. 6 shows the constitution of a communication system having this kind of the conventional network management system. As illustrated in FIG. 6, the communication system comprises a manager 601 that is a device for management, an agent 602 controlled by the manager 601, and a resource manager 603 connected to the agent 602. The manager 601 and the agent 602 are connected via a standard interface corresponding to the standard protocol. While, a protocol of particular commands is installed in an interface connecting the agent 602 and the resource manager 603 for managing the hardware resources. An MIB(Managed Information Base) 611 stores the architecture of network management information and its data base being standardized.

By the way, a program forming the resource manager 603 is produced not in an object-oriented manner but in a function-oriented manner in many cases. When the program forming the resource manager 603 is produced in a function-oriented manner, function-oriented commands are exchanged between the agent 602 and the resource manager 603. An operation request defined by the object-oriented manner between the manager 601 and the agent 602 is different from the function-oriented commands between the agent 602 and the resource manager 603 in the fundamental thinking, which necessitates a protocol converter 621 for converting the protocol between these commands.

An object-oriented operation request sent from the manager 601 to the agent 602 via the standard interface is converted into the inherent function-oriented command form (for example, into a simple structure formed by the commands and variable-length record format) used between the agent 602 and the resource manager 603, which is sent to the resource manager 603 via the inherent interface.

As a method of defining an inherent interface between the agent 602 and the resource manager 603, there is a method of defining a local management interface (an interface between an agent and a resource manager) by the GDMO (Guideline Definition Managed Object) format as disclosed in the article, "Using GDMO Description for a Local Management Interface" (written by Kenji Minato, pp. 115, B-448, Communication Society Assembly, The Institute of Electronics, Information and Communication Engineers, 1995). This method, however, is unable to define the thinking of the message exchanged by the local management interface, the architecture thereof, and the managed object to be managed by the resource manager, but only the GDMO format is adopted there as a means for expressing the definition of the particular specification.

Namely, the above-mentioned article says "An application of a local management interface can be built by the API (Application Programming Interface) similar to the standard management interface." Therefore, it appears that the standard operation by the commands such as "GET", "SET", or the like can be achieved as the API. The above article, however, does not mention the method of defining an object and the unit of the object that is a candidate for these operations.

As mentioned above, in the conventional network management system, a protocol in a local interface between an agent and a resource manager is predetermined by the individual command that differs in every device. Therefore, another detailed specification cannot be decided unless specification of either agent or resource manager is definitely decided, thereby taking a lot of labor in manufacturing a protocol converter.

When an agent and a resource manager differs from each other in the thinking of the software, an object-oriented manner or a function-oriented manner, it is necessary to develop a protocol converter for converting a message by the object-oriented manner into the commands by the function-oriented manner in every combination of an agent and a resource manager, thereby taking a lot of labor and time in the development.

Further, since a local interface between an agent and a resource manager is of original specification decided in every device, when developing a management system for a different device, an interface portion between the agent and the resource manager must be developed newly, thereby deteriorating efficiency.

SUMMARY OF THE INVENTION

An object of the present invention is, in order to solve the above problems, to provide a network management system capable of decreasing the labor in developing a protocol converting program for an agent to improve the productivity, by converting the message to be exchanged in an interface between an agent and a resource manager into the message capable of conforming with the form of an operation request standardized by the standard protocol.

In addition to the above object, another object of the present invention is to provide a network management system capable of decreasing a labor in developing a protocol converting program in an agent and improving the convenience of development work of a protocol converting program, by standardizing a general message format.

Further another object of the present invention is, in addition to the above objects, to provide a network management system capable of improving the recyclability of the software resources and improving the maintenance, by standardizing a general message format and making an interface shared between different devices in the standardized portion so as to enable the diversion of an agent or a resource manager between different devices.

According to one aspect of the invention, a network management system for managing a device connected to a network, comprises management means for managing a device connected to the network by a standard protocol, resource management means for managing resources of the managed device connected to the network by an inherent protocol depending on the type of the managed device, and interface means, directly managed by the management means, for sending the resource management means an operation request issued from the management means by the standard protocol after it has been converted into the operation request by the inherent protocol if necessary, and sending the management means a reply message from the resource management means after it has been converted into the message by the standard protocol, wherein the interface means having a managed information base storing an architecture of a network management information and a data base relative to the network management information being standardized, the resource management means managing an instance of the managed device by the same unit as a managed object in the managed information base.

The inherent protocol may be produced in an object-oriented way similarly to the standard protocol and the managed object in the managed information base is defined in the object-oriented way.

In the preferred construction, a format of a message by the inherent protocol between the interface means and the resource management means is produced by a common format corresponding to the standard protocol.

In the preferred construction, a format of a message by the inherent protocol between the interface means and the resource management means is produced by a common format corresponding to the standard protocol, the format including an object header area for describing an execution result of an operation request issued from the management means, an object information area for describing an identifier of an instance of the managed device to be managed by the resource management means, and a request parameter area for describing attribute information including at least attribute type, attribute identifier, and attribute value in the operation requested by the operation request.

The object header area may include a field for describing a whole message length contained in an operation request, and a field for describing an execution result of the message.

The object information area may include a field for describing an identifier of an instance of the managed device, and a field for describing hierarchical identification number for identifying the instance at once in the interface means.

In another preferred construction, the request parameter area includes a field for describing the number of attributes in the operation requested by the operation request, and a field for describing the detailed information on the attributes, the field for describing the information on the attributes further includes a field for describing the attribute type in the operation requested by the operation request, a field for describing the attribute identifier, and a field for describing a request parameter area that is an area for describing the attribute information including the attribute value.

In another preferred construction, the request parameter area includes a field for describing the number of attributes in the operation requested by the operation request, and a field for describing the detailed information on the attributes, the field for describing the information on the attributes further includes a field for describing the attribute type in the operation requested by the operation request, a field for describing the attribute identifier, and a field for describing a request parameter area that is an area for describing the attribute information including the attribute value, the field for describing the attribute type further includes a field for describing an attribute information type representing a fundamental type of the attribute, and a field for describing an attribute type code representing a concrete code of the attribute.

The object header area may include a field for describing a whole message length contained in an operation request, and a field for describing an execution result of the message;

the object information area may include a field for describing an identifier of an instance of the managed device, and a field for describing hierarchical identification number for identifying the instance at once in the interface means; and the request parameter area may include a field for describing the number of attributes in the operation requested by the operation request, and a field for describing the detailed information on the attributes, the field for describing the information on the attributes further may include a field for describing the attribute type in the operation requested by the operation request, a field for describing the attribute identifier, and a field for describing a request parameter area that is an area for describing the attribute information including the attribute value.

The object header area may include a field for describing a whole message length contained in an operation request, and a field for describing an execution result of the message;

the object information area may include a field for describing an identifier of an instance of the managed device, and a field for describing hierarchical identification number for identifying the instance at once in the interface means; and the request parameter area may include a field for describing the number of attributes in the operation requested by the operation request, and a field for describing the detailed information on the attributes, the field for describing the information on the attributes further may include a field for describing the attribute type in the operation requested by the operation request, a field for describing the attribute identifier, and a field for describing a request parameter area that is an area for describing the attribute information including the attribute value, the field for describing the attribute type further may include a field for describing an attribute information type representing a fundamental type of the attribute, and a field for describing an attribute type code representing a concrete code of the attribute.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE REFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
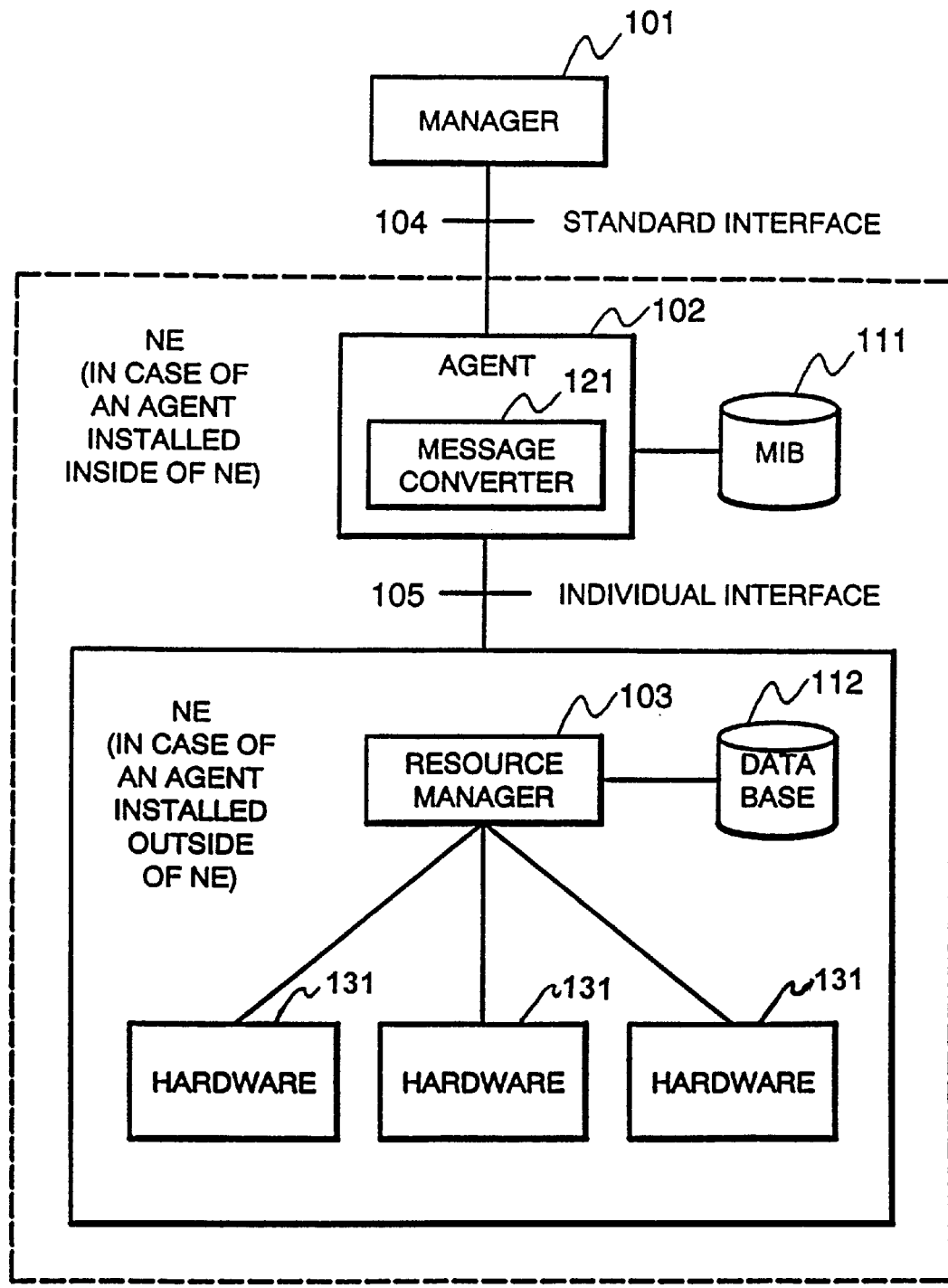
FIG. 1 is a block diagram showing the whole constitution of a communication system having a network management system according to an embodiment of the present invention.

FIG. 1 is a block diagram showing the whole constitution of a communication system having a network management system according to an embodiment of the present invention.

With reference to FIG. 1, the communication system of the present embodiment comprises a manager 101 for performing management, an agent 102 connected to the manager 101 via a standard interface 104 based on the standard protocol such as CMIP (Common Management Information Protocol) of OSI, SNMP, or the like, a resource manager 103 connected to the agent 102 via an individual interface 105 for the individual use on the basis of the inherent protocol. An MIB 111 storing the instance being standardized that is a candidate for management is connected to the agent 102. The hardware 131 that is the final managed object and a data base 112 storing the management information on the same hardware 131 are connected to the resource manager 103. The agent 102, the resource manager 103, and the hardware 131 are managed components to be managed by the manager 101. As the constitution of a system, the agent 102 may be installed inside of the network element (NE) to be managed (refer to the range surrounded by the broken line of FIG. 1), or it may be installed outside of the NE (refer to the range surrounded by the solid line of FIG. 1). FIG. 1 shows only the characteristic components in the embodiment, while other general components are not illustrated therein. For example, though FIG. 1 shows only one set of the managed components including an agent 102 and a resource manager 103, it is needless to say that a plurality of the managed components of the like combination are managed by the manager 101 actually.

The manager 101 is realized by a CPU controlled by a program, so to manage the NE, issuing a request based on the standard protocol.

The agent 102 is realized by a CPU controlled by a program, which may include a message converter 121 for converting the message sent from the manager 101 if necessary. When a given operation is requested from the manager 101, if the data relative to the operation is stored only in the MIB 111 connected to the agent 102, the agent 102 performs the operation only on the managed instance stored in the MIB 111. On the contrary, if the operation request requires an operation having a direct relationship to the hardware, the agent 102 sends the message converter 121 the operation request.

Upon receipt of the operation request from the agent 102, the message converter 121 converts the details of the operation request from the message format of the standard interface 104 to the specification of the individual interface 105. The operation request whose format is converted by the message converter 121 is sent to the resource manager 103 via the individual interface 105.

Upon receipt of the operation request whose format is converted, the resource manager 103, through access to the data base 112 storing the management information of the hardware, performs the processing on the information corresponding to the operation request. If necessary, it performs modification processing on the setting of the corresponding hardware.

Figure 2:
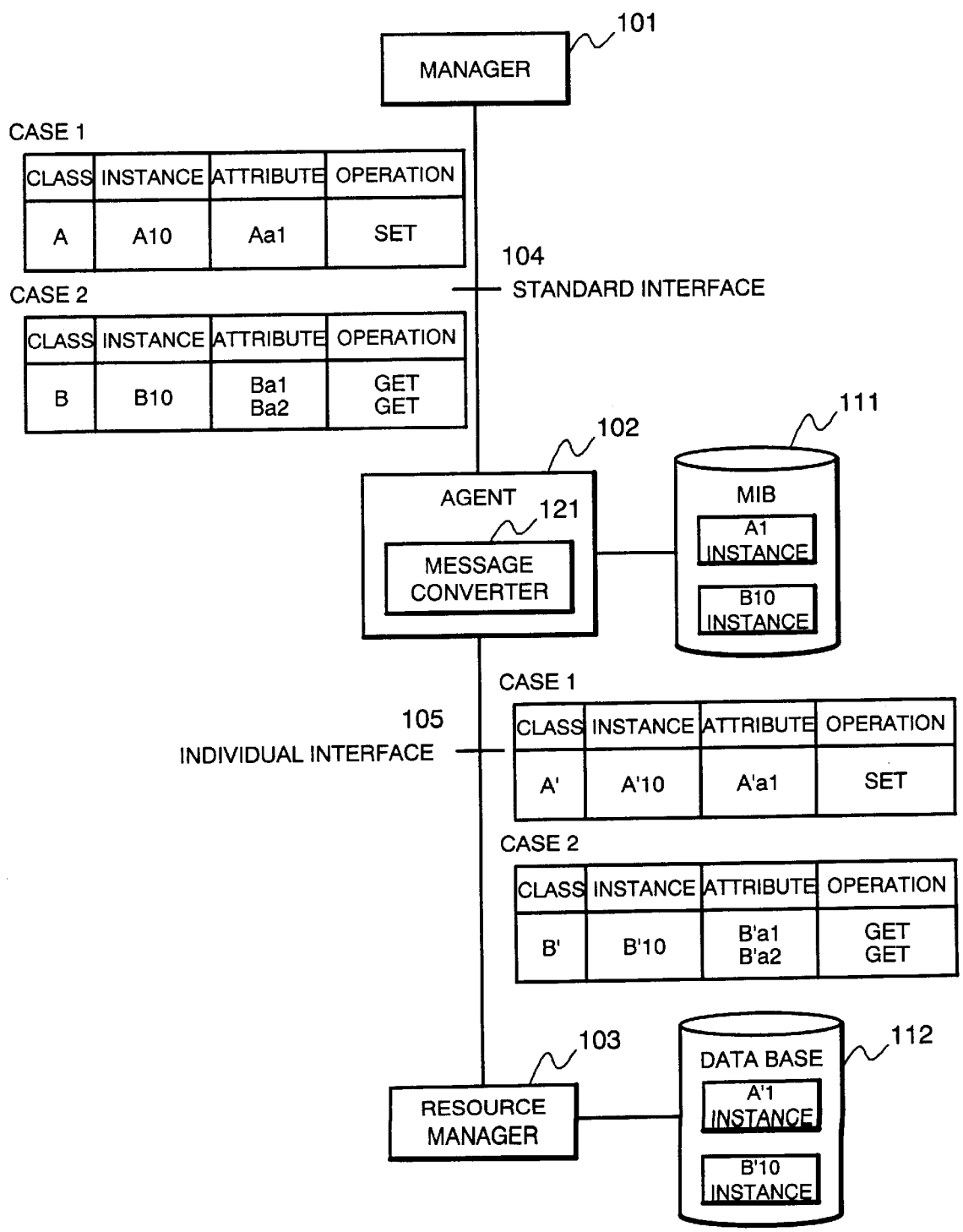
FIG. 2 is a view showing the correspondence of the message format between a standard interface and an individual interface according to the embodiment.
Figure 3:
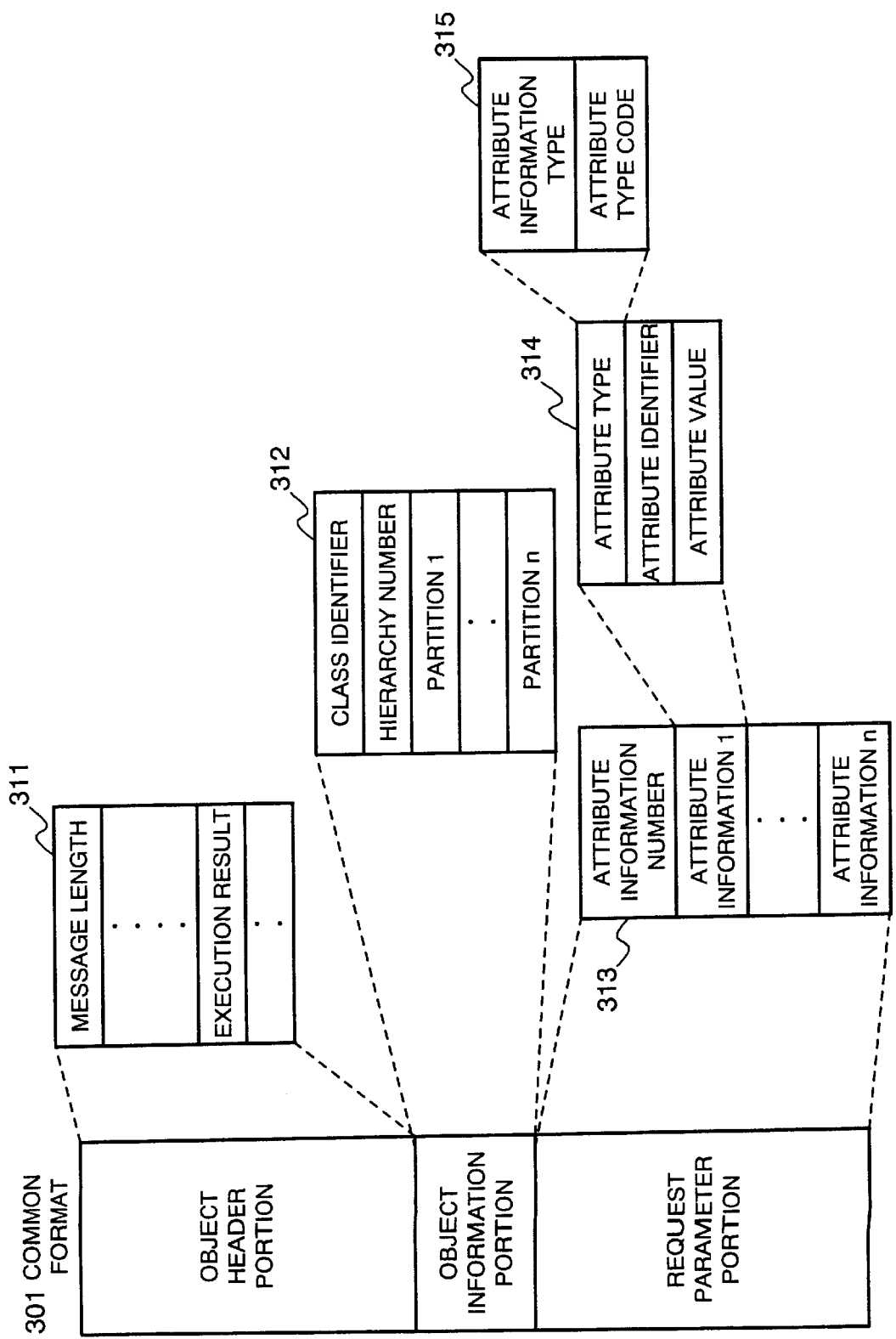
FIG. 3 is a view showing the outline of the message format in the interface between an individual agent and a resource manager according to the embodiment.

This time, an operation of the embodiment will be described with reference to FIGS. 2, 3, and 4.

Figure 4:
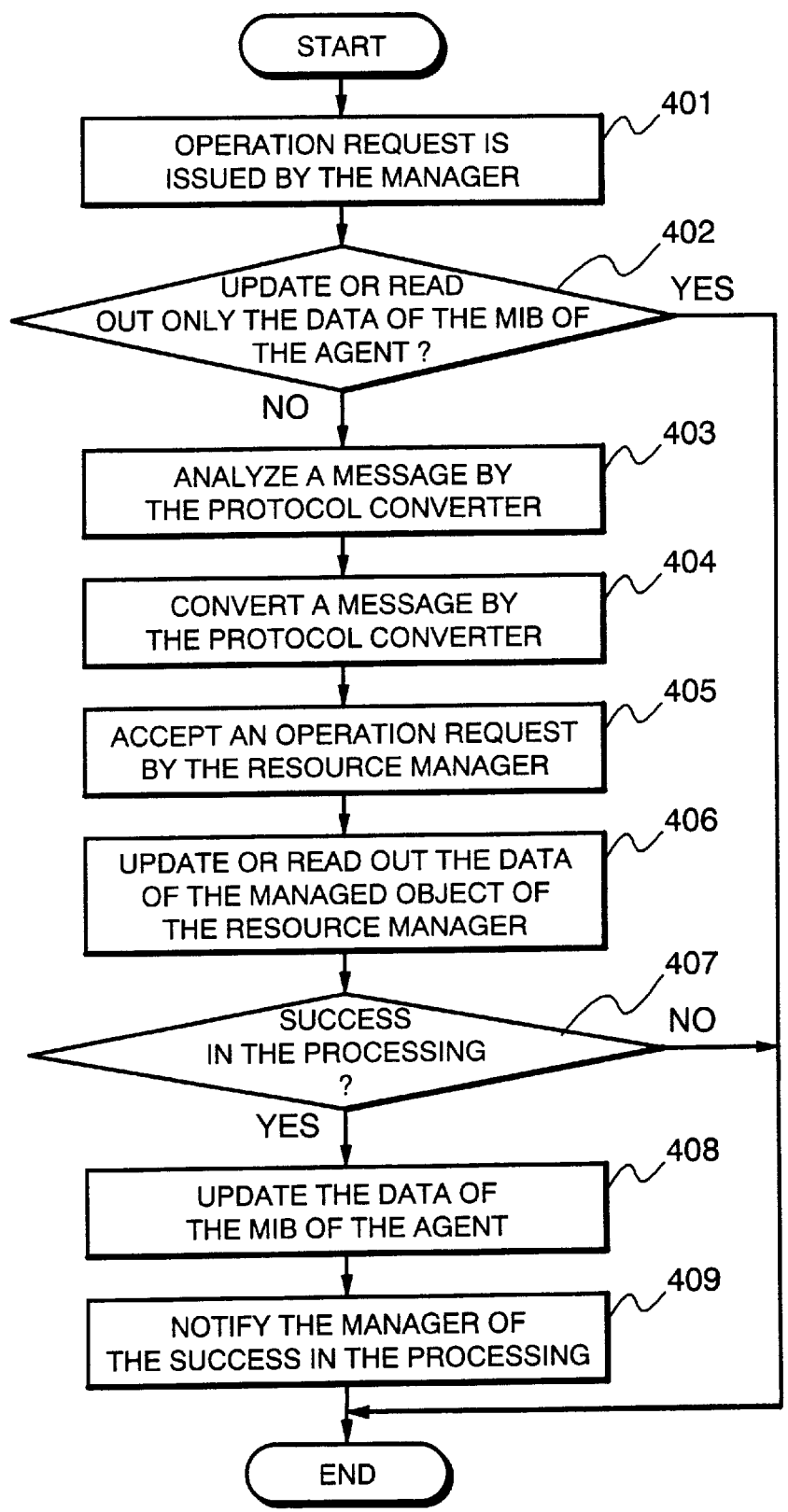
FIG. 4 is a flow chart showing an operation of the embodiment.

Fist of all, the manager 101 issues an operation request to a managed instance stored in the MIB 111 of the agent 102 according to the standard protocol (Step 401 in FIG. 4).

Upon receipt of the operation request, the agent 102 judges whether or not there exists the substance of an attribute to be processed by the operation request. If exists, it further judges whether it is necessary to modify the managed instance only stored in the MIB 111 of the agent 102 or read out the value thereof, or whether it is further necessary to modify or read out the data stored in the data base 112 managed by the resource manager 103 (Step 402). If the operation request requires modifying or reading out the data stored in the MIB 111 only, the agent 102 modifies the data of the MIB 111 only, and returns the result to the manager 101, thereby completing the processing.

On the other hand, if an operation request from the manager 101 needs to modify the instance stored in the data base 112 managed by the resource manager 103 or read out the value thereof, the agent 102 sends the operation request to the message converter 121. The message converter 121, upon receipt of the operation request, analyzes the message included in the operation request (Step 403).

When, the message converter 121 analyzes the message included in the operation request received from the agent 102 in the following analytical items;

A) "which class is requested"
B) "which instance of the class is requested"
C) "what operation is made to which attribute of the instance"
D) "what is concretely performed on the attribute"

Then, the message converter 121 converts the message according to the standard protocol into the message of original format (Step 404). The message converter 121 creates a message 301 having a common format consisting of an object header portion, an object information portion, and a request parameter portion as illustrated in FIG. 3.

More specifically, the object header portion 311 has a field for inserting the whole message length there or a field for inserting the execution result such as success or failure in response. In the object information portion 312, the results of the analytical items; "which class is requested" and "which instance of the class is requested", received from the agent 102, are respectively set in a class identifier and partitions 1 to n. The partitions 1 to n indicate hierarchical identification numbers for the resource manager 103 identifying the instance of the corresponding class at once. The request parameter portion 313 consists of an attribute information number indicating the number of attributes corresponding to the demanded operation and some attribute information portions indicating the detailed information of the attributes. Each attribute information portion 314 further consists of fields of an attribute type, an attribute identifier, and an attribute value as illustrated in FIG. 3. Further, the fields of the attribute type 315 consists of an attribute information type indicating the fundamental type of the attribute and an attribute code indicating the specific code thereof. An identifier for identifying the corresponding attribute out of the attributes that the specified instance has, is inserted in the attribute identifier field, and the value of the specified attribute is set in the attribute value field.

The operation request converted into the above-mentioned format by the message converter 121 is sent to the resource manager 103 via the individual interface 105. The resource manager 103, upon receipt of the operation request (Step 405), performs the processing based on the operation request on the instance to be managed by the resource manager 103 (Step 406).

After the necessary processing, the resource manager 103 judges the success or failure in this processing (Step 407). In case of the failure, the resource manager 103 reports the response of the failure to the agent 102 via the message converter 121 according to the common format as illustrated in FIG. 3, thereby completing the processing.

On the other hand, in case of the success, the resource manager 103 similarly reports the response of the success to the agent 102 via the message converter 121. Upon receipt of the response of the success in the processing, the agent 102 gives the result of the operation request to the MIB 111 so that the result can be reflected in the MIB 111 (Step 408). However, if the operation request is to require reading out the value, it is needless to say that the data within the MIB 111 is not substantially updated.

The agent 102 notifies the manager 101 of the success in the processing (Step 409) after the processing performed on the MIB 111, thereby completing the processing.

Figure 5:
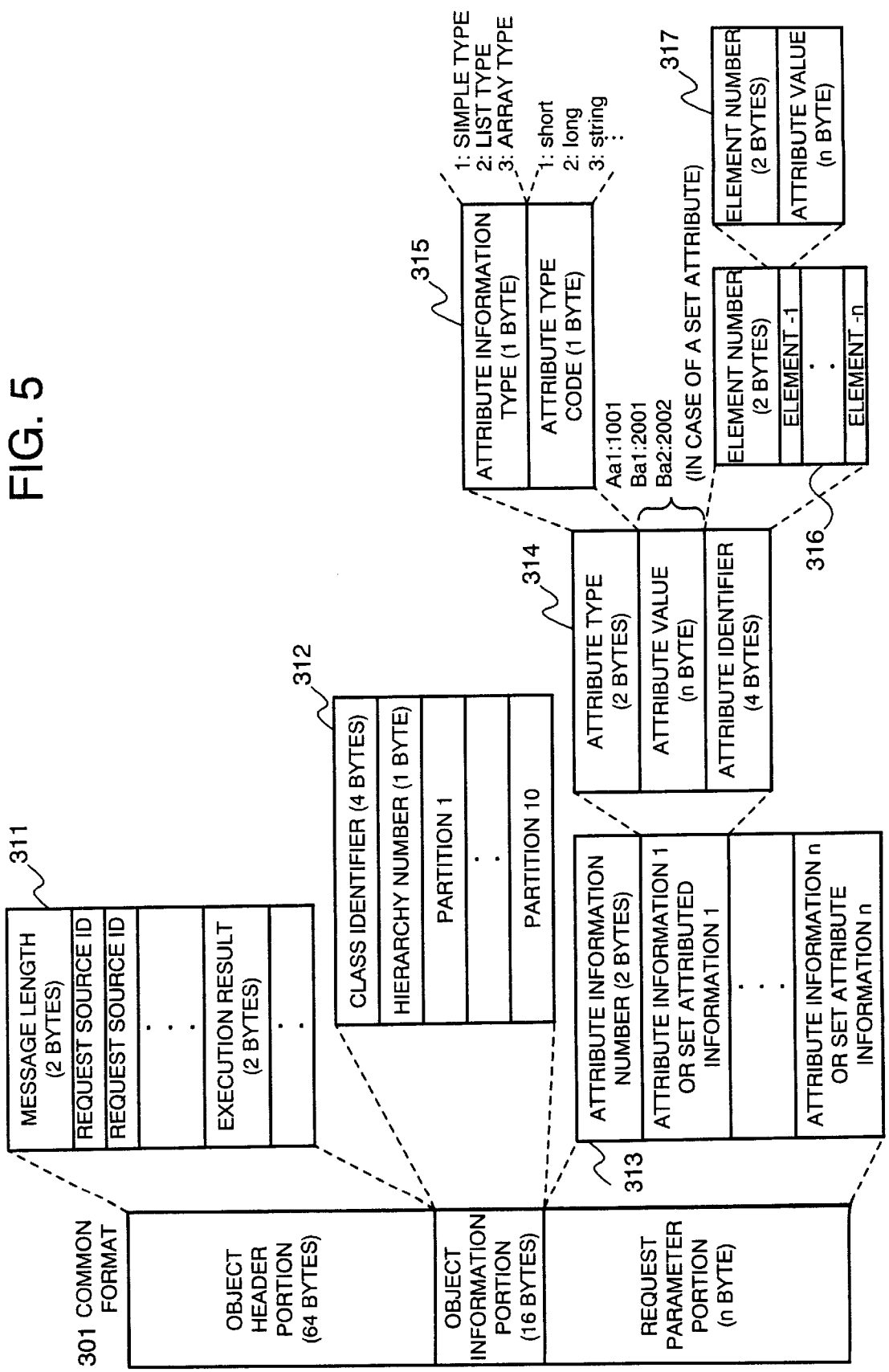
FIG. 5 is a view showing the outline of the message in the interface between an individual agent and a resource manager for use in explaining an example of more specific operation according to the embodiment.
Figure 6:
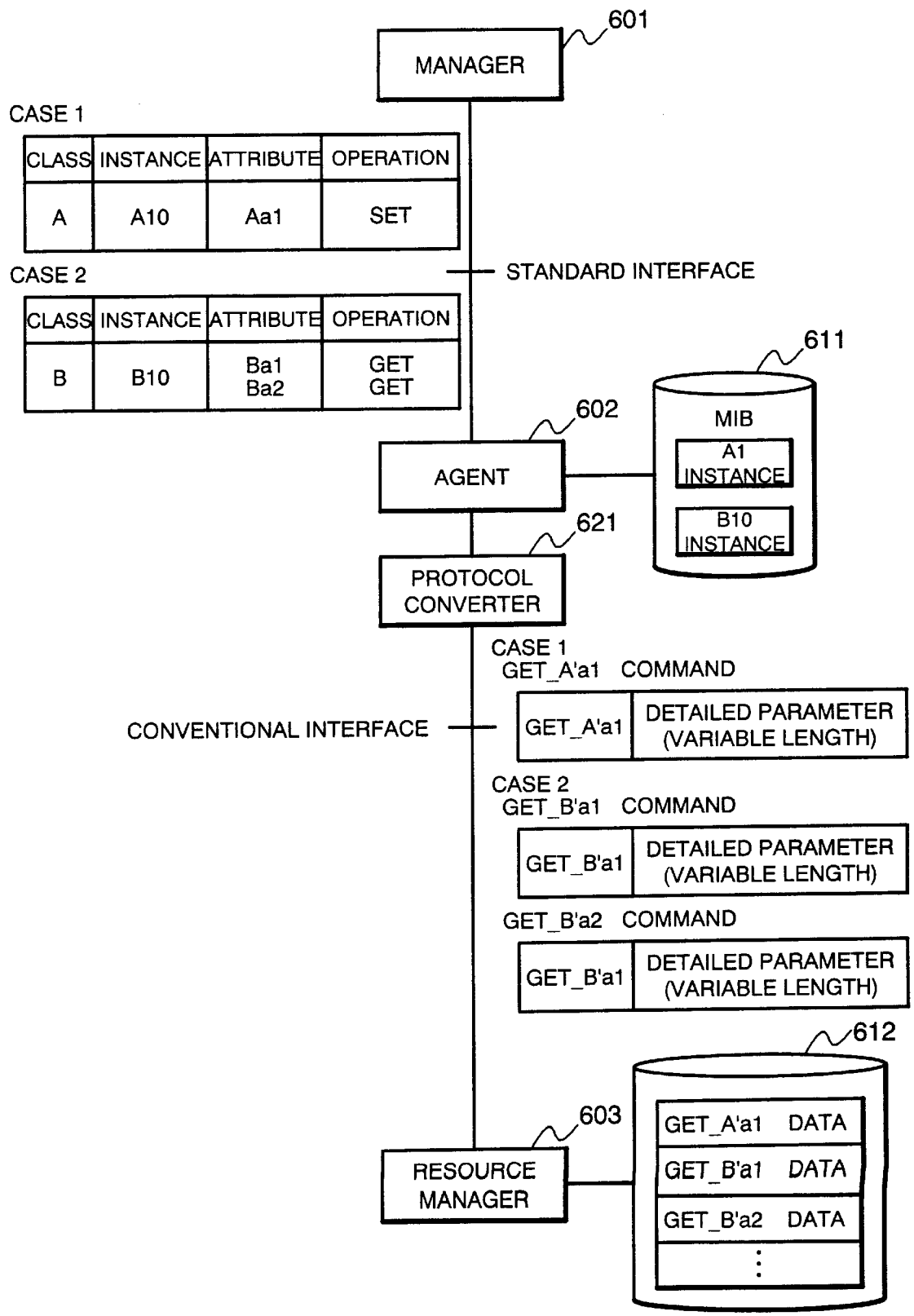
FIG. 6 is a block diagram showing a whole constitution of a communication system having the conventional network management system.

Further detailed explanation of the operation example in the above-mentioned embodiment will be made with reference to FIG. 5.

As illustrated in "Case1" of FIG. 2, the description will be made in case of the operation request "SET" for the attribute $A_{a1}$ of the instance $A_1$ in the class A, that is the standard MO (Managed Object) standardized by the CMIP of the OSI, being issued from the manager 101 to the agent 102. The value of this class, because of having a direct relationship to the setting of the hardware, is assumed to be the data managed by the data base 112 connected to the resource manager 103 on condition that the type of the data is the simple-typed integer value (short type) of two bytes.

The agent 102, upon receipt of the operation request "SET" from the manager 101, judges that updating of the data within the resource manager 103 is involved in the corresponding data, and sends the message converter 121 within the agent 102 the operation request "SET" (Steps 401 and 402 of FIG. 4).

The message converter 121, upon receipt of the operation request "SET", analyzes the message of the standard protocol included in the operation request and converts it into the message format corresponding to the individual interface 105 (Steps 403 and 404 of FIG. 4).

More specific conversion in this operation example will be described with reference to FIG. 5. First, a format of the object header portion 311 is generated from the message 301, and an identifier for identifying the request source of the operation request (in this case, ID for identifying the agent 102) and an identifier for identifying the request destination (in this case, ID for identifying the resource manager 103) are set therein. Further, in addition to the above identifiers, the object header portion 311 has, for example, an invoke identifier for identifying the correspondence between a request and the reply, and a message type field for representing the type of the message, that is, whether the message 301 is a request or a response, or a notice from the resource manager 103, depending on the necessity, and the message converter 121 sets also these values.

The message converter 121 converts the setting of the object information portion 312 on the basis of the information on the class and the instance specified by the agent 102. In this operation example, when the instance $A_1$ of the class A corresponds to, for example, the function 8 of the card installed in the slot 5 in the shelf 1 of the hardware, "0001" representing the class A' managed by the resource manager 103 corresponding to the class A is set in the class identifier and "3" is set in the number of the hierarchy, as the value to be set in the object information portion 312. In the field for representing each hierarchy partition, "1" is set in the partition 1, "5" is set in the partition 2, and "8" is set in the partition 3 for representing the shelf 1, slot 5, and function 8 correspondingly.

The message converter 121 performs the setting of the request parameter portion 313. In this operation example, since the identifier of the attribute $A'_{a1}$ managed by the resource manager 103 corresponding to the attribute $A_{a1}$ requested by the "SET" operation is "1001", "1001" is set in the field of the attribute identifier of the attribute information portion (attribute information 1 or set attribute information 1) 314 in the request parameter portion 313. An updated value by the "SET" request is set in the field of the attribute value. As the attribute information type, "1" representing a simple type is set in the field of the attribute type 315 and the number "1" representing the integer (short) of two bytes is set in the attribute type code. In this case, since the attribute requested by the "SET" from the agent 102 is one, the number of the attribute information in the request parameter portion 313 is filled with "1", so that only one field of the attribute information fields 1 to n is used.

After completion of the setting of the above respective information, the message converter 121 writes the value of the whole message length into the field of the message length of the object header portion 311 in the end, thereby completing the message analysis and conversion processing.

The converted message is sent from the message converter 121 to the resource manager 103. The resource manager 103 updates the value for the attribute $A'_{a1}$ of the instance $A_1'$ of the class A' that is the data of the managed instance stored in the data base 112, according to the message delivered (Steps 405 and 406).

In case of normal termination of the processing, the resource manager 103 generates the response by the message format of the individual interface 105 and sends it to the agent 102. The agent 102 converts the response into the message format of the CMIP standardized by the standard protocol of the standard interface 104 and sends it to the manager 101, thereby completing the processing (Steps 407 to 409).

Next, the description will be made in case of the operation request "GET" for the attribute $B_{a1}$ and the attribute $B_{a2}$ of the instance $B_{10}$ of the class B, that is the standard MO standardized by the CMIP of the OSI, being issued from the manager 101 to the agent 102, as illustrated in "Case2" of FIG. 2. The value of this class, because of having a direct relationship to the setting of the hardware, is assumed to be the data managed by the data base 112 connected to the resource manager 103 on condition that the type of the data of the attribute $B_{a1}$ is the list-typed integer value (short type) of two bytes and that the type of the data of the attribute $B_{a2}$ is the array-typed string (string type).

The agent 102, upon receipt of the operation request "GET" from the manager 101, judges that updating of the data within the resource manager 103 is involved in the corresponding data, and sends the message converter 121 within the agent 102 the operation request "GET" (Steps 401 and 402 of FIG. 4).

The message converter 121, upon receipt of the operation request "GET", analyzes the message of the standard protocol included in the operation request and converts it into the message format corresponding to the individual interface 105 (Steps 403 and 404 of FIG. 4).

More specific conversion in this operation example will be described with reference to FIG. 5. First, a format of the object header portion 311 is generated from the message 301, and an identifier for identifying the request source of the operation request (in this case, ID for identifying the agent 102) and an identifier for identifying the request destination (in this case, ID for identifying the resource manager 103) are set therein. Further, in addition to the above identifiers, the object header portion 311 has, for example, an invoke identifier for identifying the correspondence between a request and the reply, and a message type field for representing the type of the message, that is, whether the message 301 is a request or a response, or a notice from the resource manager 103, depending on the necessity, and the message converter 121 sets also these values.

The message converter 121 converts the setting of the object information portion 312 on the basis of the information on the class and the instance specified by the agent 102. In this operation example, when the instance $B_{10}$ of the class B corresponds to, for example, No. 5 of the function 6 of the card installed in the slot 3 in the shelf 1 of the hardware, "0002" representing the class B' managed by the resource manager 103 corresponding to the class B is set in the class identifier and "4" is set in the number of the hierarchy, as the values to be set in the object information portion 312. In the field for representing each hierarchy partition, "1" is set in the partition 1, "3" is set in the partition 2, "6" is set in the partition 3, and "5" is set in the partition 4 for representing the shelf 1, slot 3, function 6, and number 5 correspondingly.

The message converter 121 performs the setting of the request parameter portion 313. In this operation example, since two kinds of attributes, $B_{a1}$ and $B_{a2}$ are candidates for the "GET" request, "2" is set in the number of the attribute information. Since the identifier of the attribute $B'_{a1}$ managed by the resource manager 103 corresponding to the attribute $B_{a1}$ is "2001" in the region "attribute information 1 or set attribute information 1" of the attribute information portion 314, "2001" is set in the field of the attribute identifier. Since the identifier of the attribute $B'_{a2}$ managed by the resource manager 103 corresponding to the attribute $B_{a2}$ is "2002" in the region "attribute information 2 or set attribute information 2", "2002" is set in the field of the attribute identifier. Since the operation request "GET" requires reading out the value of the data managed by the data base 112 of the resource manager 103, none of the value is set in the field of the attribute value at the stage of receiving the operation request from the agent 102.

Then, "2" representing a list type as the attribute information type corresponding to the attribute $B'_{a1}$ is set in the field of the attribute type 315 in "attribute information 1 or set attribute information 1", and the number "1" representing the integer (short) of two bytes is set in the attribute type code. While, "3" representing an array type as the attribute information type corresponding to the attribute $B'_{a2}$ is set in the field of the attribute type 315 in "attribute information 2 or set attribute information 2", and the number "3" representing the string is set in the attribute type code.

After completion of the setting of the above respective information, the message converter 121 writes the value of the whole message length into the field of the message length of the object header portion 311 in the end, thereby completing the message analysis and conversion processing.

The converted message is sent from the message converter 121 to the resource manager 103. The resource manager 103 reads out the value for the attribute $B'_{a1}$ and $B'_{a2}$ of the instance $B'_{10}$ of the class B' that is the data of the managed instance stored in the data base 112, according to the delivered message (Steps 405 and 406).

In case of normal termination of the processing, the resource manager 103 sets the value read out by the message format of the individual interface 105 as a response. In this operation example, the types of the attributes are a list type and an array type, both being a set attribute. Therefore, the format in case of the set attribute is adopted in the field of the attribute value in the attribute information 314 (attribute information or set attribute information) as shown in the attribute value 316 of FIG. 5. The number of attribute elements read out is set in the field of the element number, and the number of the element and the read out value (an integer-type of two bytes in case of the attribute $B_{a1}$, and a string-type in case of the attribute $B_{a2}$) are set in the filed of the elements 1 to n representing the value of each element. After the above setting, the response to the "GET" request is sent to the agent 102.

The agent 102, upon receipt of the response from the resource manager 103, converts the response into the message format of the CMIP standardized by the standard protocol of the standard interface 104, and sends it to the manager 101, thereby completing the processing (Steps 407 and 409).

As set forth hereinabove, since the network management system of the present invention has the managed object to be managed by the resource manager by the same unit as the managed object which is managed by the MIB of the agent and defined in an object-oriented way, an instance of the MO (managed Object) specified by the operation request from the manager and an instance of the managed object in the resource manager are in a one-to-one ratio in the message converter in the agent. As for the items of the attributes that are candidates for the operation, the MIB in the agent and the attribute of the managed object in the resource manager are in a one-to-one ratio. Therefore, it becomes easy to convert the standard protocol into the original protocol of the interface inherent in the device, thereby decreasing a labor of developing a protocol converting program in the agent, so to improve the productivity.

According to the present invention, by using a common format corresponding to the standard protocol as the format of a message in the interface between the agent and the resource manager, the regulation of the attribute value by the ASN.1 (Abstract Syntax Notation 1), that is an abstract syntax for use in the standard protocol, can be converted into the bit map format capable of actually setting the hardware at ease, thereby further decreasing a labor of developing a protocol converting program in the agent.

Additionally, regulating the general message format previously enhances the independency of the object to be managed by the agent and the resource manager and enables spiral setting of each object even if a specification of the whole system is not fixed, thereby improving convenience in the development work of a protocol converting program in the agent.

Further, regulating the general message format previously enables diversion of an agent and a resource manager between different devices, so as to share a software, thereby decreasing the system cost.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A network management system for managing a device connected to a network, comprising:

management means for managing a device connected to the network, by a standard protocol;

resource management means for managing resources of the managed device connected to the network by an inherent protocol depending on the type of the managed device; and interface means, directly managed by said management means, for sending resource management means an operation request issued from said management means by the standard protocol after it has been converted into the operation request by the inherent protocol if necessary, and sending said management means a reply message from said resource management means after it has been converted into the message by the standard protocol;

wherein said interface means having a managed information base storing an architecture of a network management information and a data base relative to the network management information being standardized, said resource management means managing an instance of the managed device by the same unit as a managed object in said managed information base, and wherein the inherent protocol is produced in an object-oriented way similarly to the standard protocol and the managed object in said managed information base is defined in the object-oriented way.

2. A network management system for managing a device connected to a network, comprising:

management means for managing a device connected to the network by a standard protocol;

resource management means for managing resources of the managed device connected to the network by an inherent protocol depending on the type of the managed device; and interface means, directly managed by said management means, for sending resource management means an operation request issued from said management means by the standard protocol after it has been converted into the operation request by the inherent protocol if necessary, and sending said management means a reply message from said resource management means after it has been converted into the message by the standard protocol;

wherein said interface means having a managed information base storing an architecture of a network management information and a data base relative to the network management information being standardized, said resource management means managing an instance of the managed device by the same unit as a managed object in said managed information base, and wherein a format of a message by the inherent protocol between said interface means and said resource management means is produced by a common format corresponding to the standard protocol.

3. A network management system for managing a device connected to a network, comprising:

management means for managing a device connected to the network by a standard protocol;

resource management means for managing resources of the managed device connected to the network by an inherent protocol depending on the type of the managed device; and interface means, directly managed by said management means, for sending resource management means an operation request issued from said management means by the standard protocol after it has been converted into the operation request by the inherent protocol if necessary, and sending said management means a reply message from said resource management means after it has been converted into the message by the standard protocol;

wherein said interface means having a managed information base storing an architecture of a network management information and a data base relative to the network management information being standardized, said resource management means managing an instance of the managed device by the same unit as a managed object in said managed information base, and wherein a format of a message by the inherent protocol between said interface means and said resource management means is produced by a common format corresponding to the standard protocol, said format including an object header area for describing an execution result of an operation request issued from said management means, an object information area for describing an identifier of an instance of the managed device to be managed by said resource management means, and a request parameter area for describing attribute information including at least attribute type, attribute identifier, and attribute value in the operation requested by the operation request.

4. A network management system as set forth in claim 3, wherein said object header area includes a field for describing a whole message length contained in an operation request, and a field for describing an execution result of the message.

5. A network management system as set forth in claim 3, wherein said object information area includes a field for describing an identifier of an instance of the managed device, and a field for describing hierarchical identification number for identifying the instance at once in said interface means.

6. A network management system as set forth in claim 3, wherein said request parameter area includes a field for describing the number of attributes in the operation requested by the operation request, and a field for describing the detailed information on the attributes, said field for describing the information on the attributes further including a field for describing the attribute type in the operation requested by the operation request, a field for describing the attribute identifier, and a field for describing a request parameter area that is an area for describing the attribute information including the attribute value.

7. A network management system as set forth in claim 3, wherein said request parameter area includes a field for describing the number of attributes in the operation requested by the operation request, and a field for describing the detailed information on the attributes, said field for describing the information on the attributes further including a field for describing the attribute type in the operation requested by the operation request, a field for describing the attribute identifier, and a field for describing a request parameter area that is an area for describing the attribute information including the attribute value, said field for describing the attribute type further including a field for describing an attribute information type representing a fundamental type of the attribute, and a field for describing an attribute type code representing a concrete code of the attribute.

8. A network management system as set forth in claim 3, wherein said object header area includes a field for describing a whole message length contained in an operation request, and a field for describing an execution result of the message;

said object information area includes a field for describing an identifier of an instance of the managed device, and a field for describing hierarchical identification number for identifying the instance at once in said interface means; and said request parameter area includes a field for describing the number of attributes in the operation requested by the operation request, and a field for describing the detailed information on the attributes, said field for describing the information on the attributes further including a field for describing the attribute type in the operation requested by the operation request, a field for describing the attribute identifier, and a field for describing a request parameter area that is an area for describing the attribute information including the attribute value.

9. A network management system as set forth in claim 3, wherein said object header area includes a field for describing a whole message length contained in an operation request, and a field for describing an execution result of the message;

said object information area includes a field for describing an identifier of an instance of the managed device, and a field for describing hierarchical identification number for identifying the instance at once in said interface means; and said request parameter area includes a field for describing the number of attributes in the operation requested by the operation request, and a field for describing the detailed information on the attributes, said field for describing the information on the attributes further including a field for describing the attribute type in the operation requested by the operation request, a field for describing the attribute identifier, and a field for describing a request parameter area that is an area for describing the attribute information including the attribute value, said field for describing the attribute type further including a field for describing an attribute information type representing a fundamental type of the attribute, and a field for describing an attribute type code representing a concrete code of the attribute.

* * * * *